United States Patent Office 3,231,383
Patented Jan. 25, 1966

3,231,383
PROCESS FOR THE STABILIZATION OF l-ASCOR-
BIC ACID IN CARAMEL EXCIPIENTS
Nicolas Maria Urgoiti Somovilla, 23 Guadiana St.,
Madrid, Spain
No Drawing. Filed Nov. 6, 1962, Ser. No. 235,846
Claims priority, application Spain, Oct. 17, 1962,
281,650
3 Claims. (Cl. 99—11)

It is known that the most important of the hydrosoluble vitamins is vitamin C, or strictly speaking all substances having anti-scorbutic properties. However, the only substance employed in therapeutics, because of its great activity, is l-ascorbic acid.

The many therapeutic properties of l-ascorbic acid (scurvy, buccal affections, infections, fragilitas ossium and capillary, etc.) are fully demonstrated, and its administration is practiced generally as much by ingest as intramuscularly or intravenously, in the form of acid or salt.

l-Ascorbic acid, however, is very susceptible to oxidation. Its solid and liquid preparations lose vitaminic activity with time, which loss is hastened by the action of the atmosphere and heat.

Stable preparations of l-ascorbic acid for the above mentioned buccal and parenteral administration exist on the market already.

This invention is directed to achieving a preparation that contains large quantities of l-ascorbic acid in stable form with an agreeable excipient especially for children, which up to the present time has not been possible due to the risk of loss of the l-ascorbic acid during the caramelizing process when it is necessary to raise the temperature to 140° C. Apart from this difficulty, the incorporation of the l-ascorbic acid previous to or during the caramelizing process introduces a disagreeable taste to the caramel.

This invention solves all these difficulties concerning taste and loss due to temperature raising, by means of a process in which a calcic salt of l-ascorbic acid is used, which is much more stable than the l-ascorbic acid itself, so that it is possible to heat to the caramelizing temperature of 140° C. without appreciable loss of vitaminic value, and with the advantage of introducing no disagreeable taste into the caramel.

This process moreover, allows the caramel to protect the l-ascorbic acid from oxidation and from the moist atmosphere, thus permitting the conservation of the medicament with all its vitaminic value indefinitely.

The following example is a preferred embodiment of the invention, but in no way limits the invention.

*Example*

Dissolve 7 kgs. of l-ascorbic acid in water and neutralize the solution with 2 kgs. of calcium carbonate; filter and complete the filtrate up to a volume of 50 liters.

Dissolve 100 kgs. of saccharose in the foregoing mentioned 50 liters of dissolution, thus obtaining a solution of saccharose in calcium ascorbate which must be heated until the saccharose is completely dissolved at which moment, 20 kgs. of liquid glucose is added. The heating is continued until the temperature reaches 130 to 140° C., and when reached the heating is stopped. Traces of water are then eliminated by vacuum distillation.

In this way a mass of caramelized product is obtained containing l-ascorbic acid in stable form, while the mass is endowed with an appetizing flavor and form.

The amounts of calcium ascorbate cited are not limitative but may be widely varied, while any other salt of the l-ascorbic acid may be used instead of the calcium ascorbate.

As an alternative the l-ascorbic acid itself may be used, by first producing the caramelized mass at the temperature of 140° C. necessary for the complete dissolution of the liquid saccharose whose integrant proportion varies between 3:1 and 4:1, allowing the mass to cool to 90–100° C. and then adding the l-ascorbic acid in finely pulverized form, said acid being from 5 to 10% of the weight of the saccharose employed, homogenizing its distribution throughout the mass and finally bestowing on it the desired taste and form.

I claim:
1. The process for making stable l-ascorbic acid containing composition comprising
    (1) neutralizing a water solution of l-ascorbic acid with a calcic base, thereby forming a calcium ascorbate solution,
    (2) dissolving saccharose in the resultant calcium ascorbate solution by heating,
    (3) adding liquid glucose to the resultant saccharose-ascorbate solution while heating to a temperature of about 130 to 140° C., and
    (4) vacuum distilling the resultant product to remove substantially all water therefrom, whereby a water-free caramelized mass containing l-ascorbic acid in stable form is obtained.
2. The process for making stable l-ascorbic acid containing composition comprising
    (1) neutralizing a water solution of l-ascorbic acid with calcium carbonate, thereby forming a water solution of calcium ascorbate,
    (2) dissolving saccharose in the resultant ascorbate salt solution by heating,
    (3) adding liquid glucose to the resultant saccharose-ascorbate solution while heating to a temperature of about 130 to 140° C., and
    (4) vacuum distilling the resultant product to remove substantially all water therefrom, whereby a water-free caramelized mass containing l-ascorbic acid in stable form is obtained.
3. The process for making stable l-ascorbic acid-containing composition comprising
    (1) neutralizing a water solution of l-ascorbic acid with calcium carbonate, thereby forming a water solution of calcium ascorbate,
    (2) dissolving saccharose in the resultant solution by heating, said saccharose being 5 to 15 times by weight of calcium ascorbate,
    (3) adding liquid glucose to the resultant solution while heating to a temperature of about 130 to 140° C., said glucose being one-third to one-sixth by weight of said saccharose, and
    (4) vacuum distilling the resultant product to remove substantially all water therefrom, whereby a water-free caramelized mass containing l-ascorbic acid in stable form is obtained.

References Cited by the Examiner
UNITED STATES PATENTS

| | | | |
|---|---|---|---|
| 1,781,636 | 11/1930 | Gheynst | 99—11 |
| 2,300,439 | 11/1942 | Van der Lee | 167—81 |
| 2,596,103 | 5/1952 | Ruskin | 167—81 |
| 2,963,404 | 12/1960 | Hammer et al. | 167—82 |
| 2,980,702 | 4/1961 | Thesing et al. | 167—81 |

JULIAN S. LEVITT, *Primary Examiner.*
FRANK CACCIAPAGLIA, JR., *Examiner.*